(12) United States Patent
Schnellbacher et al.

(10) Patent No.: US 9,038,144 B2
(45) Date of Patent: *May 19, 2015

(54) MOBILITY PROTOCOL SELECTION BY AN AUTHORIZATION SYSTEM

(71) Applicant: Sprint Communications Company L.P., Overland Park, KS (US)

(72) Inventors: George Jason Schnellbacher, Overland Park, KS (US); Joao Carlos Osorio Gouvea Teixeira de Magalhaes, Shawnee, KS (US); Joseph C. Shojayi, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 14/020,449

(22) Filed: Sep. 6, 2013

(65) Prior Publication Data

US 2014/0013401 A1 Jan. 9, 2014

Related U.S. Application Data

(63) Continuation of application No. 12/726,582, filed on Mar. 18, 2010, now Pat. No. 8,566,926.

(51) Int. Cl.
*G06F 15/16* (2006.01)
*H04W 12/08* (2009.01)
*G06F 13/00* (2006.01)

(52) U.S. Cl.
CPC ............. *H04W 12/08* (2013.01); *G06F 13/00* (2013.01)

(58) Field of Classification Search
CPC ..... H04W 12/06; H04W 36/38; H04W 80/04; H04W 8/065; H04W 8/12

USPC .............. 726/3, 4, 21; 455/411, 414.1, 432.3; 705/14.33, 17; 370/236, 245, 331

See application file for complete search history.

(56) References Cited

U.S. PATENT DOCUMENTS

| | | | |
|---|---|---|---|
| 6,466,571 B1 | 10/2002 | Dynarski et al. | |
| 6,754,482 B1* | 6/2004 | Torabi | 455/410 |
| 6,978,128 B1 | 12/2005 | Raman et al. | |
| 6,999,435 B2 | 2/2006 | Perras | |
| 7,295,545 B2 | 11/2007 | Ray et al. | |
| 7,512,970 B2 | 3/2009 | Naftali et al. | |

(Continued)

OTHER PUBLICATIONS

Cisco Systems Inc.; "RADIUS Attribute—Value Pairs;" Cisco Documentation; Sep. 24, 1999; 20 pages; Cisco Systems Inc.; http://www.cisco.com/univercd/cc/td/doc/product/access/acs_soft/csacs4nt/csnt24/csnt24ug/ap_rads.htm.

(Continued)

*Primary Examiner* — Thanhnga B Truong

(57) ABSTRACT

A wireless network authorization system receives an authorization request for a wireless communication device transmitted from a visited wireless network. A processing system selects one of a simple internet connection and an encrypted internet connection for the wireless communication device in response to the authorization request. The communication interface transfers an authorization response for delivery to the visited wireless network indicating the selected one of the simple internet connection and the encrypted internet connection.

18 Claims, 6 Drawing Sheets

(56) References Cited

U.S. PATENT DOCUMENTS

| | | | |
|---|---|---|---|
| 7,533,160 | B2 | 5/2009 | Hsu |
| 8,433,286 | B2 * | 4/2013 | Suh et al. .................. 455/411 |
| 2007/0050613 | A1 | 3/2007 | Islam et al. |
| 2007/0179796 | A1 | 8/2007 | Taglienti et al. |
| 2007/0297377 | A1 | 12/2007 | McCann et al. |
| 2008/0076413 | A1 | 3/2008 | Jones |
| 2008/0108322 | A1 | 5/2008 | Upp |
| 2008/0291876 | A1 * | 11/2008 | Mukherjee et al. ........... 370/331 |
| 2008/0293417 | A1 | 11/2008 | Zhang |
| 2009/0025059 | A1 * | 1/2009 | Wang et al. .................. 726/3 |
| 2009/0043891 | A1 | 2/2009 | Woo et al. |
| 2010/0131347 | A1 * | 5/2010 | Sartipi .................. 705/14.33 |

OTHER PUBLICATIONS

Hewlett-Packard Company; "HP-UX AAA Server A.06.00 Administration and Authentication Guide;" HP-UX 11.0, 11i v1; 2003; pp. i-341; Hewlett-Packard Company; U.S.A.; http://docs.hp.com/en/T1428-90025/T1428-90025.pdf.

Juniper Networks, Inc.; "WiMAX Vendro Specific Attribute (VSA) Format;" 1999; 3 pages; Juniper Networks, Inc.; http://www.juniper.net/techpubs/software/aaa_802/sbrc/sbrc70/sw-sbrc-admin/html/WiMAX_Overview6.html.

Sergey Poznyakoff; "How Radius Operates;" Nov. 20, 2004; 10 pages; Spivak.kiev.ua; http://www.spivak.kiev.ua/radius/radius_3.html.

* cited by examiner

MOBILITY PROTOCOL SELECTION BY AN AUTHORIZATION SYSTEM

RELATED CASES

This patent application is a continuation of U.S. patent application Ser. No. 12/726,582 that was filed Mar. 18, 2010 and is entitled "MOBILITY PROTOCOL SELECTION BY AN AUTHORIZATION SYSTEM." U.S. patent application Ser. No. 12/726,582 is hereby incorporated by reference into this patent application.

TECHNICAL BACKGROUND

Wireless communication networks typically include wireless communication devices which, via a wireless access node, communicate with further communication networks and equipment. Recently, a growing demand for mobile high speed data transfers has resulted in the publication of several internet protocol (IP) mobility protocols as standardized by the Internet Engineering Task Force (IETF). These mobile IP standards attempt to solve the problem of a wireless communication device roaming within a network by providing location-independent routing of data packets.

Using mobile IP, a wireless communication device is associated with a home wireless network and an anchored home IP address. The home wireless network includes a home agent that stores information about the wireless communication device. When the wireless communication device roams into a foreign wireless network, the device is associated with a care-of-address which identifies its current location, and the home address is associated with the local endpoint of a tunnel to the home agent. Mobile IP specifies how a wireless communication device registers with its home agent and how the home agent routes packets to and from the wireless device through the tunnel.

Simple IP is another IP mobility standard. Unlike mobile IP, simple IP does not require routing packets through a tunnel to a home agent of a wireless communication device. Instead, under the simple IP protocol, a wireless communication device receives a dynamic IP from a local packet data service node (PDSN) in a visited wireless network and the visited wireless network provides a direct routing service for the wireless communication device. In the simple IP protocol, a wireless communication device must obtain a new IP address (and lose existing connections) every time it changes its point of attachment. Thus, when the wireless communication device moves from a coverage area of one PDSN to another PDSN, a change in the packet data session occurs when a new IP address is assigned by the new PDSN.

Overview

A wireless network authorization system receives an authorization request for a wireless communication device transmitted from a visited wireless network. A processing system selects one of a simple internet connection and an encrypted internet connection for the wireless communication device in response to the authorization request. The communication interface transfers an authorization response for delivery to the visited wireless network indicating the selected one of the simple internet connection and the encrypted internet connection.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
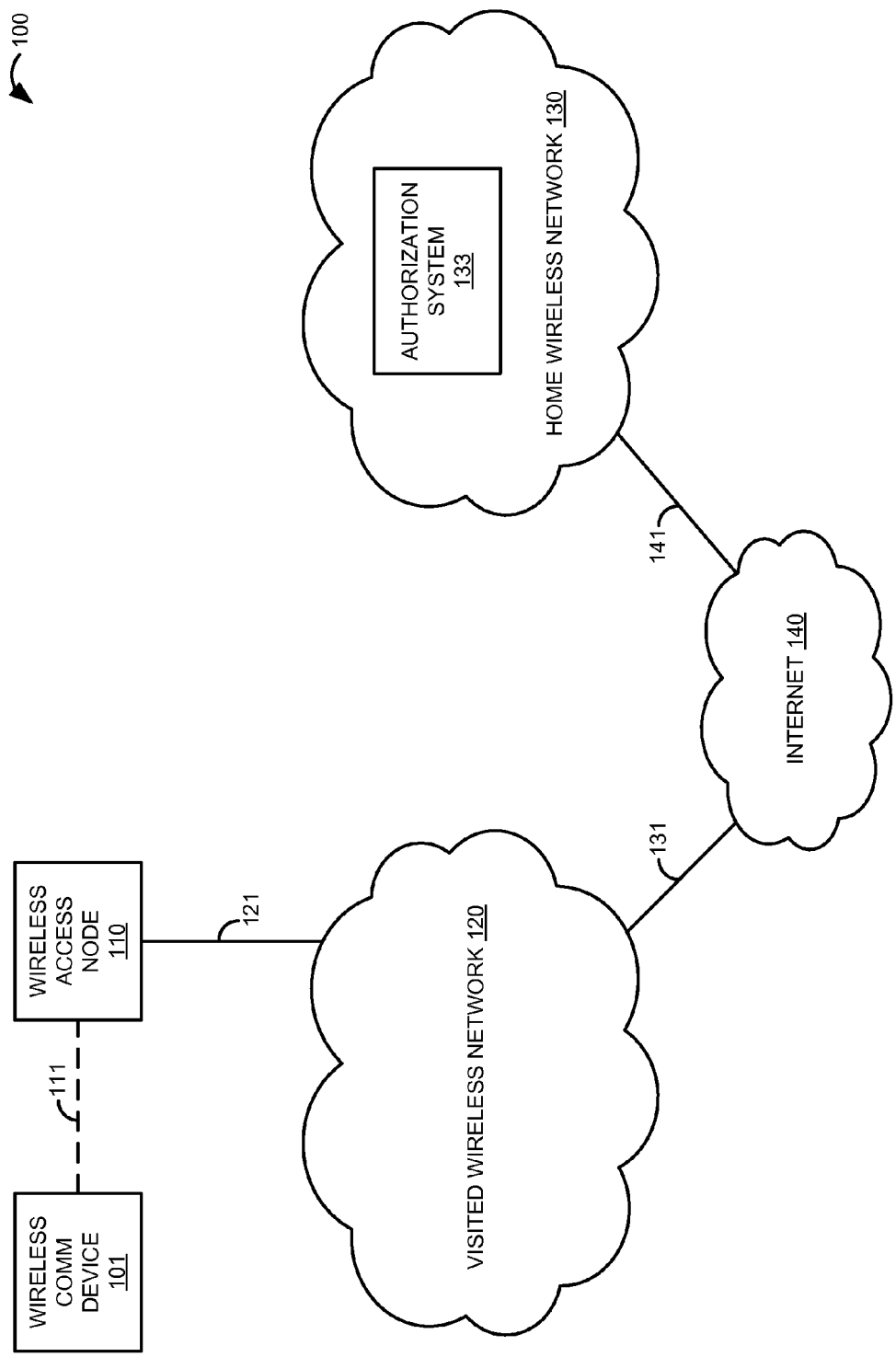
FIG. 1 is a block diagram that illustrates a communication system.

FIG. 1 is a block diagram that illustrates communication system 100. Communication system 100 includes wireless communication device 101, wireless access node 110, visited wireless network 120, home wireless network 130, and internet communication network 140. Home wireless network 130 includes authorization system 133. Wireless communication device 101 communicates with wireless access node 110 over wireless communication link 111. Wireless access node 110 is in communication with visited wireless network 120 over communication link 121. Visited wireless network 120 communicates with internet communication network 140 over communication link 131. Home wireless network 130 communicates with internet communication network 140 over communication link 141. Thus, visited wireless network 120 is in communication with home wireless network 130 over communication links 131, 141, and internet communication network 140.

Figure 2:
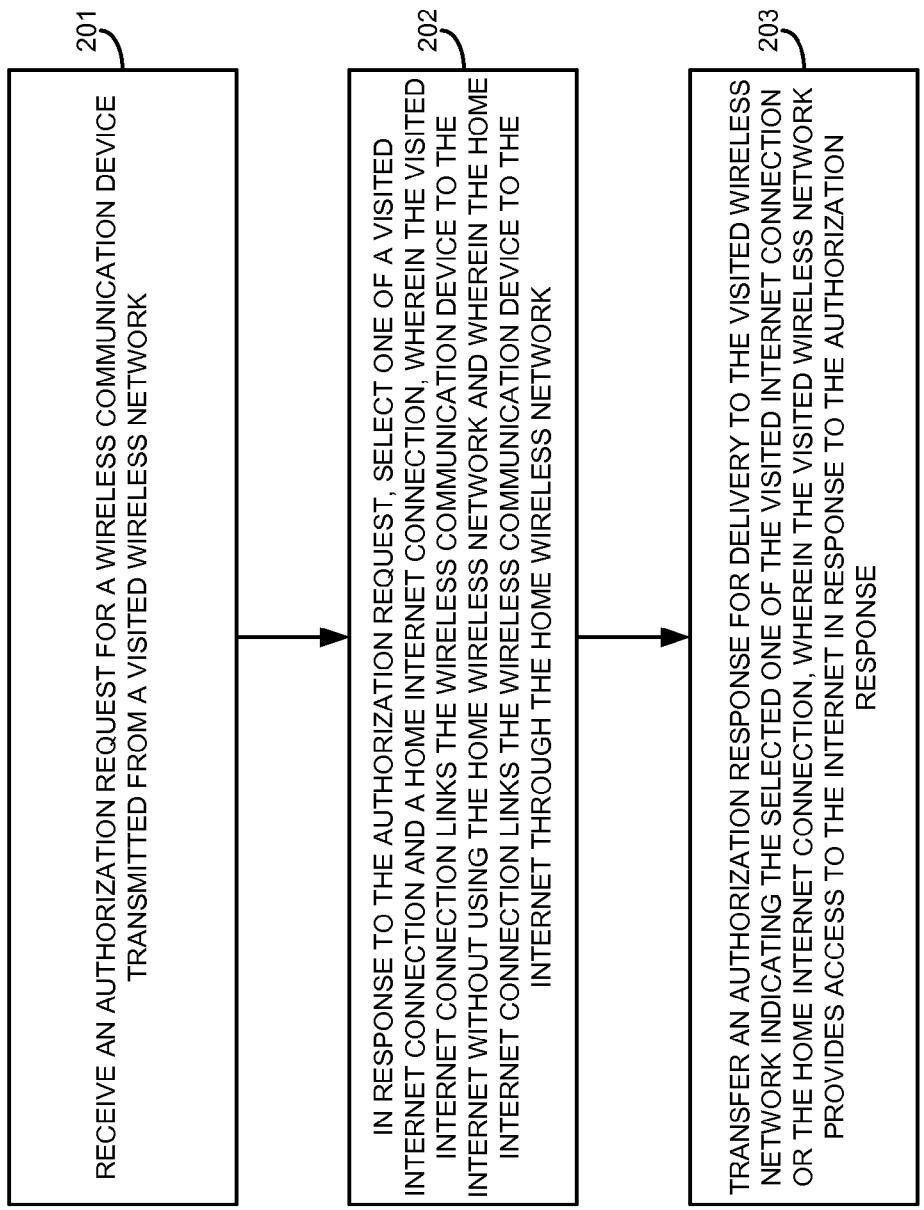
FIG. 2 is a flow diagram that illustrates an operation of the communication system.

FIG. 2 is a flow diagram that illustrates an operation of communication system 100. In particular, the operation shown in FIG. 2 depicts a method of operating authorization system 133 in home wireless network 130, wherein wireless communication device 101 is associated with home wireless network 130 and transfers a request to visited wireless network 120 for access to internet communication network 140.

In FIG. 2, authorization system 133 receives an authorization request for wireless communication device 101 transmitted from visited wireless network 120 (201). Typically, visited wireless network 120 will transmit the authorization request for delivery to home wireless network 130 in response to receiving the request from wireless communication device 101 for access to internet communication network 140. The request from wireless communication device 101 typically comprises user credentials and a unique identifier that identifies device 101 or its user to wireless networks 120 and 130. For example, the unique identifier could comprise a telephone number, packet address, Electronic Serial Number (ESN), Mobile Station Identifier (MSID), Mobile Equipment Identifier (MEID), International Mobile Equipment Identity (IMEI), International Mobile Subscriber Identity (IMSI), or some other identifier that uniquely identifies wireless communication device 101 and/or a user of device 101. The authorization request received by authorization system 133 typically instructs authorization system 133 to authenticate and authorize wireless communication device 101 to access internet communication network 140 via visited wireless network 120. The authorization request could comprise any message in any protocol, but in some examples, authorization system 133 receives the authorization request in a remote authentication dial in user service (RADIUS) request message, such as an Access-Request message in the RADIUS networking protocol. In other examples, authorization system 133 receives the authorization request in a diameter request message, such as an AA-Request or a Diameter-EAP-Request in the diameter networking protocol.

In response to the authorization request, authorization system 133 selects one of a visited internet connection and a home internet connection for wireless communication device 101 (202). The visited internet connection results in linking wireless communication device 101 to internet communication network 140 without using home wireless network 130 (202). In contrast, the home internet connection links wireless communication device 101 to internet communication network 140 through home wireless network 130 (202). In some examples, the visited internet connection links wireless communication device 101 to internet communication network 140 without using the home wireless network 130 by utilizing a simple IP protocol, and the home internet connection links wireless communication device 101 to internet communication network 140 through home wireless network 130 by utilizing a mobile IP protocol. Authorization system 133 may select one of a visited internet connection and a home internet connection for wireless communication device 101 based on any criteria, such as a realm of wireless communication device 101, a user request included in the authorization request, an application executing on device 101 indicated in the authorization request, or based on default values, for example. In some examples, authorization system 133 selects one of a visited internet connection and a home internet connection for a common realm of wireless communication device 101. Also, in some examples, authorization system 133 may select the home internet connection based on a user profile for wireless communication device 101 that indicates an enterprise access user, and may select the visited internet connection based on a user profile for wireless communication device 101 that indicates an Internet access user.

Authorization system 133 transfers an authorization response for delivery to visited wireless network 120 indicating the selected one of the visited internet connection or the home internet connection (203). Thus, authorization system 133 typically includes the selection of the visited internet connection or the home internet connection in the authorization response, so the authorization response typically comprises the selected one of the visited internet connection or the home internet connection. The authorization response could comprise any message to visited wireless network 120 in any protocol, but in some examples, authorization system 133 transfers the authorization response for delivery to visited wireless network 120 in a RADIUS response message, such as an Access-Accept message in the RADIUS networking protocol. In other examples, authorization system 133 transfers the authorization response for delivery to visited wireless network 120 in a diameter response message, such as an AA-Answer or a Diameter-EAP-Answer in the diameter networking protocol.

In response to the authorization response, visited wireless network 120 provides wireless communication device 101 access to internet communication network 140 (203). Visited wireless network 120 typically provides the access to internet communication network 140 for wireless communication device 101 according to the selected one of the visited internet connection or the home internet connection received by visited wireless network 120 in the authorization response. Thus, when the selected one indicates the home internet connection, visited wireless network 120 links wireless communication device 101 to internet communication network 140 through home wireless network 130. In some examples, visited wireless network 120 links wireless communication device 101 to internet communication network 140 through home wireless network 130 by a secure tunnel between visited wireless network 120 and home wireless network 130. However, when the selected one indicates the visited internet connection, visited wireless network 120 links communication device 101 to internet communication network 140 without using home wireless network 130. In some examples, visited wireless network 120 links wireless communication device 101 to internet communication network 140 directly over communication link 131. Advantageously, authorization system 133 of home wireless network 130 may select the manner in which wireless communication device 101 connects to internet communication network 140 when device 101 is roaming in visited wireless network 120.

Referring back to FIG. 1, wireless communication device 101 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV- DO, EV-DO rev. A, 3GPP LTE, WiMAX, Wi-Fi, Bluetooth, Internet, telephony, or some other communication format—including combinations thereof.

Visited wireless network 120 comprises the core network of a wireless communication provider, and could include routers, gateways, telecommunication switches, servers, processing systems, or other communication equipment and systems for providing communication and data services. Likewise, home wireless network 130 comprises the core network of a wireless communication provider, and could include routers, gateways, telecommunication switches, servers, processing systems, or other communication equipment and systems for providing communication and data services. Wireless networks 120 and 130 could comprise wireless communication nodes, telephony switches, Internet routers, network gateways, computer systems, communication links, or some other type of communication equipment—including combinations thereof. Wireless networks 120 and 130 may also comprise optical networks, asynchronous transfer mode (ATM) networks, packet networks, metropolitan-area networks (MAN), or other network topologies, equipment, or systems—including combinations thereof. Wireless networks 120 and 130 may be configured to communicate over metallic, wireless, or optical links. Wireless networks 120 and 130 may be configured to use time-division multiplexing (TDM), Internet Protocol (IP), Ethernet, optical networking, wireless protocols, communication signaling, or some other communication format—including combinations thereof. In some examples, wireless networks 120 and 130 include further access nodes and associated equipment for providing communication services to many wireless communication devices across a large geographic region.

Authorization system 133 comprises a computer system and communication interface. Authorization system 133 may also include other components such a router, server, data storage system, and power supply. Authorization system 133 may reside in a single device or may be distributed across multiple devices. Authorization system 133 may be a discrete system or may be integrated within other systems—including other systems within home wireless network 130. Authorization system 133 could comprise an authentication, authorization, and accounting (AAA) server, packet gateway, mobile switching center, network gateway system, Internet access node, application server, service node, firewall, or some other communication system—including combinations thereof. Authorization system 133 is in communication with internet communication network 140 over communication link 141.

Internet communication network 140 comprises multiple network elements such as routers, gateways, telecommunication switches, servers, processing systems, or other communication equipment and systems for providing communication and data services. Internet communication network 140 could comprise wireless communication nodes, telephony switches, Internet routers, network gateways, computer systems, communication links, or some other type of communication equipment—including combinations thereof. Internet communication network 140 may also comprise optical networks, ATM networks, packet networks, wide area networks (WAN), MAN, or other network topologies, equipment, or systems—including combinations thereof. Internet communication network 140 may be configured to communicate over metallic, wireless, or optical links. Internet communication network 140 may be configured to use TDM, IP, Ethernet, optical networking, wireless protocols, communication signaling, or some other communication format—including combinations thereof. In some examples, internet communication network 140 includes further access nodes and associated equipment for providing communication services across a large geographic region.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, and 141 use metal, air, space, optical fiber such as glass or plastic, or some other material as the transport media—including combinations thereof. Communication links 121, 131, and 141 could use various communication protocols, such as TDM, IP, Ethernet, telephony, optical networking, hybrid fiber coax (HFC), communication signaling, wireless protocols, or some other communication format—including combinations thereof. Communication links 121, 131, and 141 may be direct links or could include intermediate networks, systems, or devices.

Figure 3:
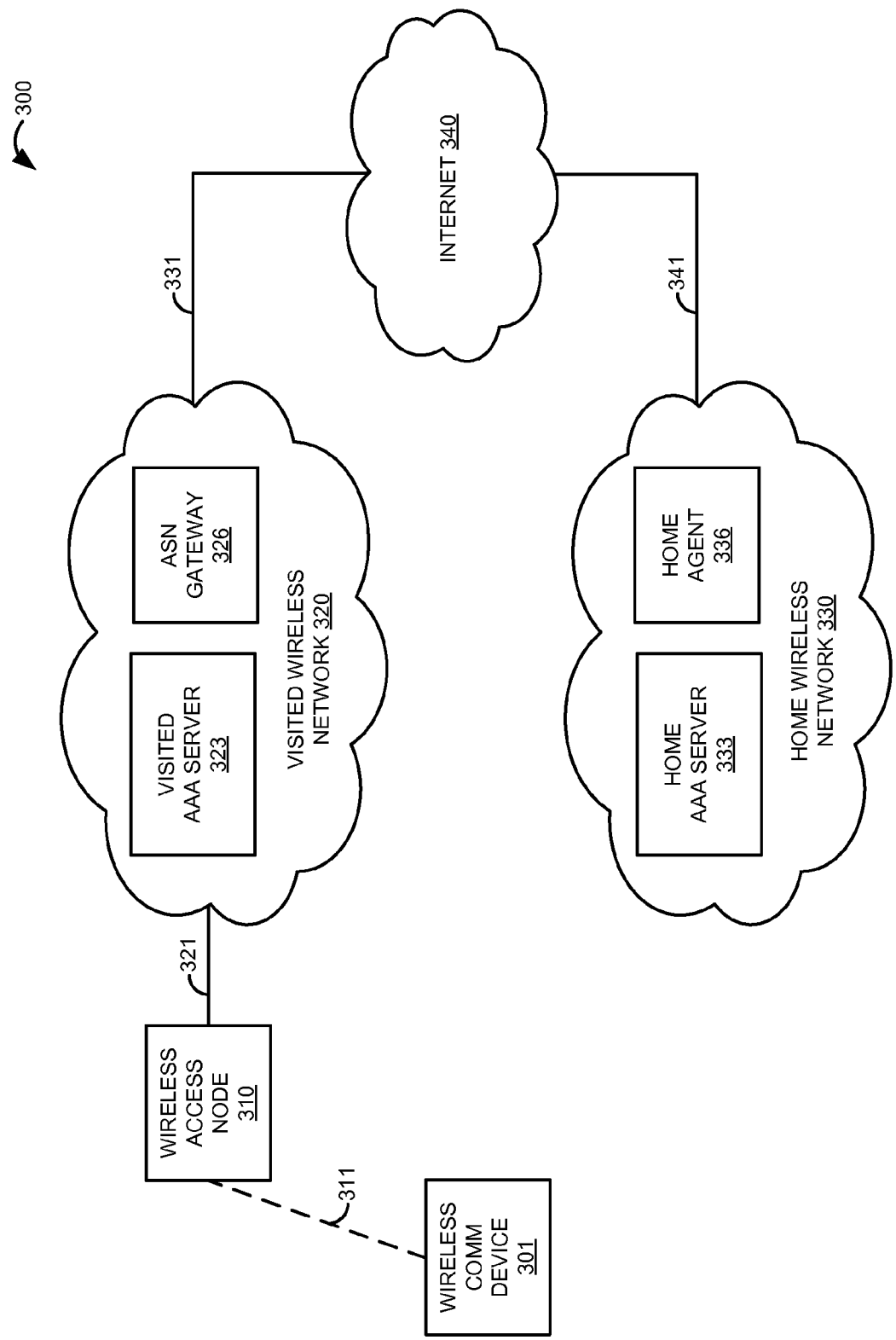
FIG. 3 is a block diagram that illustrates a communication system in an exemplary embodiment.

FIG. 3 is a block diagram that illustrates communication system 300 in an exemplary embodiment. Communication system 300 includes wireless communication device 301, wireless access node 310, visited wireless network 320, home wireless network 330, and internet 340. Visited wireless network 320 includes visited AAA server 323 and access service network (ASN) gateway 326. Home wireless network 330 includes home AAA server 333 and home agent 336. Wireless communication device 301 in is communication with wireless access node 310 over wireless communication link 311. Wireless access node 310 communicates with visited wireless network 320 over communication link 321. Visited wireless network 320 and home wireless network 330 are in communication with each other over internet 340 via respective communication links 331 and 341. In the exemplary embodiment of FIG. 3, visited wireless network 320 and home wireless network 330 comprise WiMAX wireless networks.

Figure 4:
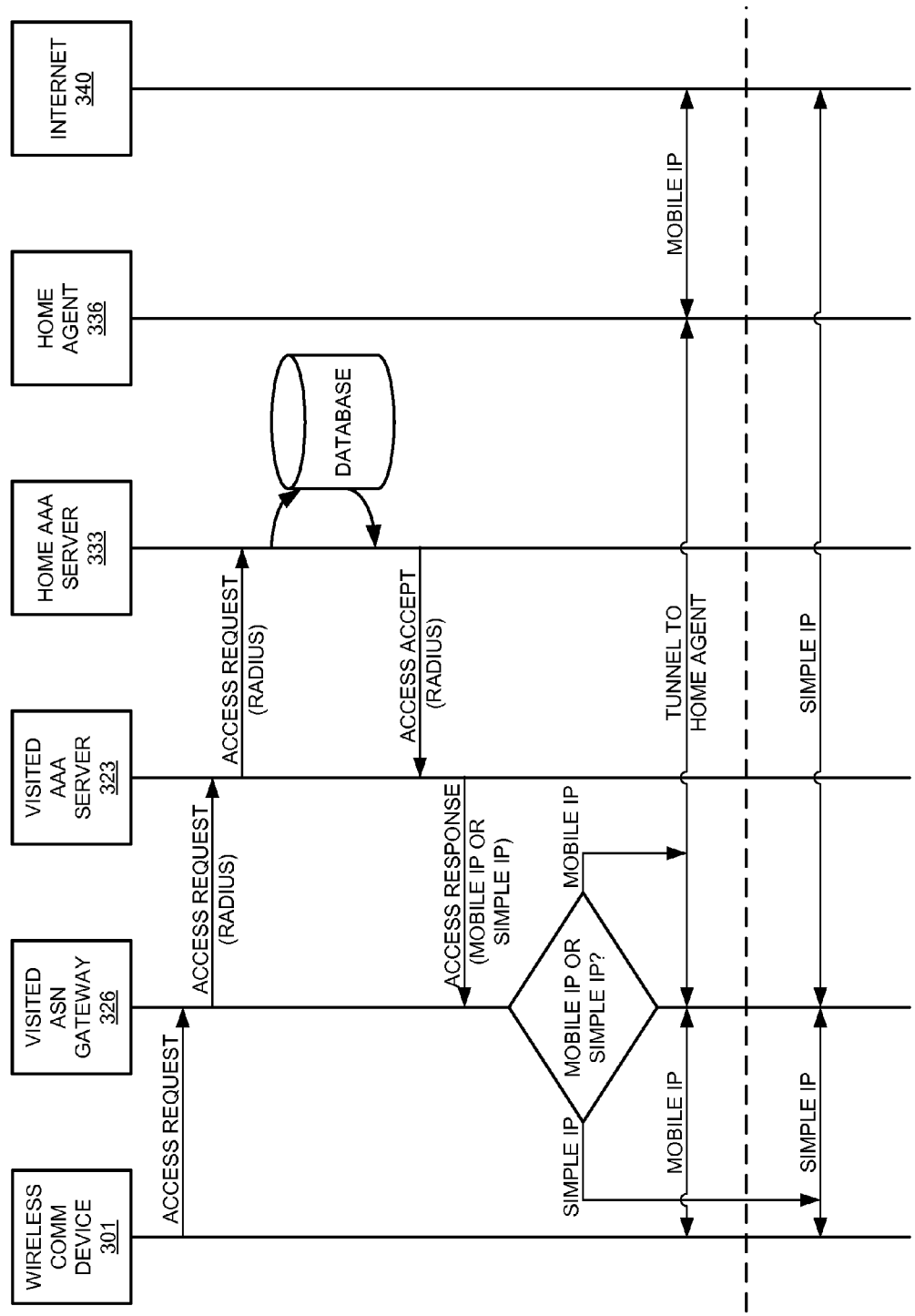
FIG. 4 is a sequence diagram that illustrates an operation of the communication system in an exemplary embodiment.

FIG. 4 is a sequence diagram that illustrates an operation of communication system 300 in an exemplary embodiment. The sequence diagram of FIG. 4 depicts a scenario in which wireless communication device 301 has an associated home agent 336 in home wireless network 330 and device 301 is roaming within visited wireless network 320. In order to gain access to internet 340, wireless communication device 301 transfers an access request to ASN gateway 326 requesting access to internet 340.

ASN gateway 326 receives the access request from wireless communication device 301. The access request typically includes access credentials in the form of a username and password or security certificate provided by the user of wireless communication device 301. In addition, the access request may contain the user's realm either prefixed and/or appended to the username. Upon receipt of the access request from wireless communication device 301, ASN gateway 326 forwards the access request to visited AAA server 323 in a RADIUS Access-Request message.

The realm included in the username of the RADIUS Access-Request message identifies where visited AAA server 323 should forward the RADIUS Access-Request message for processing. Thus, based on the realm for the username indicated in the Access-Request, visited AAA server 323 proxies the Access-Request to the home AAA server 333 for that realm.

Upon receipt of the proxied RADIUS Access-Request message from visited AAA server 323, home AAA server 333 processes the user credentials and other information contained in the Access-Request message to authenticate the user of wireless communication device 301 and authorize the user for access to internet 340. To process the user credentials, home AAA server 333 typically accesses a database comprising authentic user credentials to verify the credentials provided by the user of wireless communication device 301 in the RADIUS Access-Request message. Upon successful authentication of the user, home AAA server 333 formulates a RADIUS Access-Accept message.

In formulating the RADIUS Access-Accept message, home AAA server 333 selects a mobility protocol for wireless communication device 301. The mobility protocol could comprise a mobile IP or simple IP protocol, such as mobile IPv4, mobile IPv6, simple IPv4, or simple IPv6, for example. Note that home AAA server 333 selects the mobility protocol for wireless communication device 301 for a common realm of device 301, i.e., the realm included in the username of the RADIUS Access-Request message. Home AAA server 333 may select the mobility protocol for wireless communication device 301 based on any criteria, such as the realm of wireless communication device 301, a request for a particular mobility protocol included in the Access-Request, an application executing on device 301 indicated in the Access-Request, or based on default values, for example. In some examples, home AAA server 333 may select a mobile IP protocol based on a user profile for wireless communication device 301 that indicates an enterprise access user, and may select a simple IP protocol based on a user profile for wireless communication device 301 that indicates an Internet access user. Once home AAA server 333 has selected the mobility protocol for wireless communication device 301, home AAA server 333 transfers a RADIUS Access-Accept message for delivery to visited AAA server 323 and includes an attribute for the selected mobility protocol for device 301 in the Access-Accept message.

Visited AAA server 323 receives the RADIUS Access-Accept message from home AAA server 333. Visited AAA server 323 processes the Access-Accept message to determine the selected mobile IP or simple IP mobility protocol as indicated in the Access-Accept message. Visited AAA server 323 then formulates an access response message for the ASN gateway 326 which includes the mobile IP or simple IP mobility protocol selected by home AAA server 333. Visited AAA server 323 then transfers the access response message comprising the mobile IP or simple IP mobility protocol selection to ASN gateway 326.

ASN gateway 326 receives the access response message from visited AAA server 323 and processes the access response to determine the mobility protocol selected by home AAA server 333. If ASN gateway 326 determines that the access response comprises a mobile IP protocol, ASN gateway 326 connects wireless communication device 301 to internet 340 through its home agent 336 in the mobile IP protocol. ASN gateway 326 connects wireless communication device 301 to internet 340 via home agent 336 by establishing a secure IP tunnel between ASN gateway 326 and home agent 336. Once the tunnel from ASN gateway 326 to home agent 336 is established, home agent 336 handles all communication traffic between wireless communication device 301 and internet 340.

However, if ASN gateway 326 determines that the access response comprises a simple IP protocol, ASN gateway 326 connects wireless communication device 301 directly to internet 340, as shown in the simple IP connection scenario below the dashed line on FIG. 4. Thus, when a simple IP mobility protocol is indicated in the access response, ASN gateway 326 connects wireless communication device 301 straight to internet 340 in the simple IP protocol, without using home agent 336 or home wireless network 330. In this manner, ASN gateway 326 provides a more direct and efficient connection between wireless communication device 301 and internet 340, especially when visited wireless network 320 and home wireless network 330 are separated by a great distance.

Figure 5:
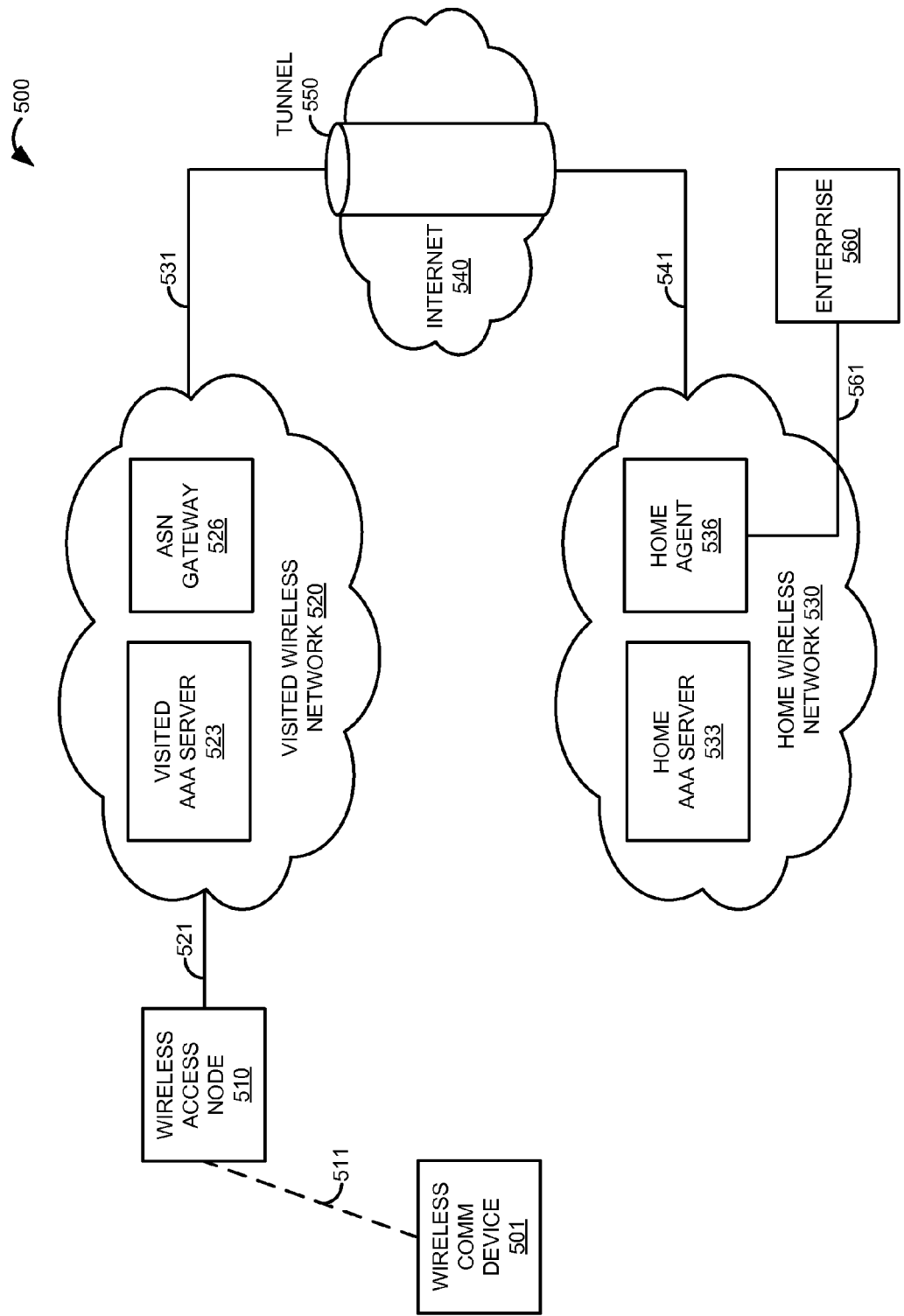
FIG. 5 is a block diagram that illustrates a communication system in an exemplary embodiment.

FIG. 5 is a block diagram that illustrates communication system 500 in an exemplary embodiment. Communication system 500 includes wireless communication device 501, wireless access node 510, visited wireless network 520, home wireless network 530, internet 540, and enterprise 560. Visited wireless network 520 includes visited AAA server 523 and ASN gateway 526. Home wireless network 530 includes home AAA server 533 and home agent 536. Wireless communication device 501 in is communication with wireless access node 510 over wireless communication link 511. Wireless access node 510 communicates with visited wireless network 520 over communication link 521. Visited wireless network 520 and home wireless network 530 are in communication with each other over internet 540 via respective communication links 531 and 541. Home agent 536 is in communication with enterprise 560 over communication link 561.

Communication system 500 depicts a scenario in which visited AAA server 523 has transferred an Access-Request message in a RADIUS protocol for delivery to home AAA server 533, and home AAA server 533 has selected a mobile IP protocol based on a user profile for wireless communication device 501 that indicates a requirement for the user of device 501 to access enterprise 560. Thus, home AAA server 533 has transferred an Access-Accept message in a RADIUS protocol for delivery to visited AAA server 523. Home AAA server 533 has included a mobility attribute in the Access-Accept message that indicates the mobile IP selection for wireless communication device 501.

Based on the mobility attribute indicating mobile IP in the Access-Accept message, visited AAA server 523 has transferred an access response message to ASN gateway 526. In response to the access response message, ASN gateway 526 has established a secure tunnel 550 over internet 540 to the home agent 536 of wireless communication device 501. Home agent 536 can then provide a secure connection for wireless communication device 501 to access enterprise 560 over communication link 561. In this manner, all communications between wireless communication device 501 and enterprise 560 are transferred over secure connections, and may be encrypted or otherwise protected in order to safeguard the data transmitted between wireless communication device 501 and enterprise 560.

Figure 6:
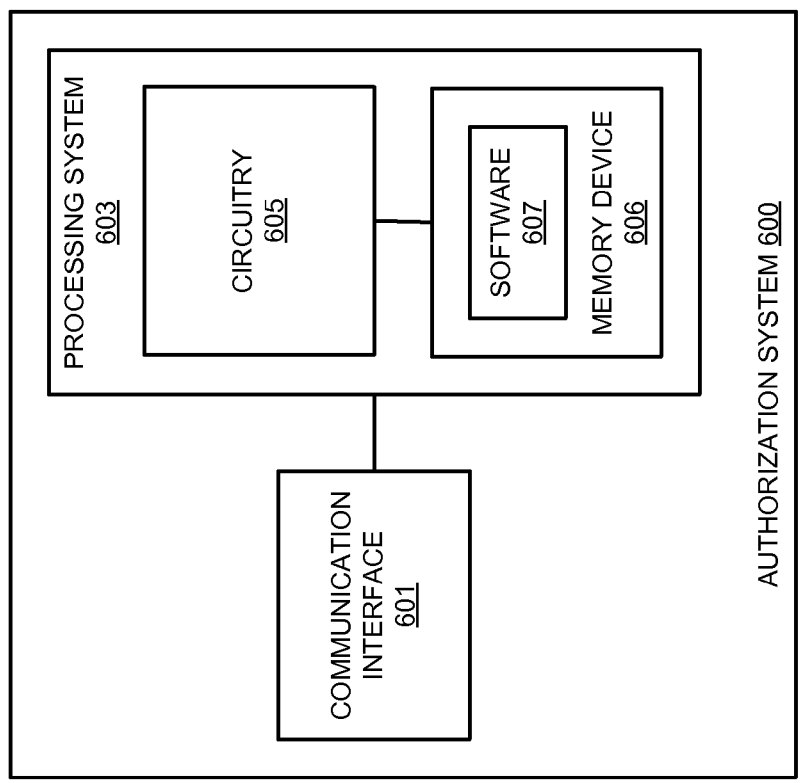
FIG. 6 is a block diagram that illustrates an authorization system.

FIG. 6 is a block diagram that illustrates authorization system 600. Authorization system 600 provides an example of authorization system 133, although system 133 may use alternative configurations. Authorization system 600 comprises communication interface 601 and processing system 603. Processing system 603 is linked to communication interface 601. Processing system 603 includes processing circuitry 605 and memory device 606 that stores operating software 607.

Communication interface 601 comprises components that communicate over communication links, such as network cards, ports, RF transceivers, processing circuitry and software, or some other communication components. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof. Communication interface 601 is configured to receive an authorization request for a wireless communication device transmitted from a visited wireless network, and configured to transfer an authorization response for delivery to the visited wireless network indicating a selected one of a visited internet connection or a home internet connection.

Processing circuitry 605 comprises microprocessor and other circuitry that retrieves and executes operating software 607 from memory device 606. Memory device 606 comprises a disk drive, flash drive, data storage circuitry, or some other memory apparatus. Operating software 607 comprises computer programs, firmware, or some other form of machine-readable processing instructions. Operating software 607 may include an operating system, utilities, drivers, network interfaces, applications, or some other type of software. When executed by circuitry 605, operating software 607 directs processing system 603 to operate as described herein for authorization system 133. In particular, operating software 607 directs processing system 603 to select one of a visited internet connection and a home internet connection for a wireless communication device in response to an authorization request. Further, operating software 607 may direct processing system 603 to direct communication interface 601 to transfer an authorization response for delivery to a visited wireless network, wherein the authorization response indicates the selected one of the visited internet connection or the home internet connection.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless network authorization system, the method comprising:
   receiving an authorization request comprising a Diameter request message for internet access by a wireless communication device transmitted from a visited wireless network, the wireless network authorization system associated with a home wireless network of the wireless communication device;
   in response to the authorization request, selecting one of a simple internet connection and an encrypted internet connection for the wireless communication device; and
   transferring an authorization response comprising a Diameter response message for delivery to the visited wireless network indicating to the visited wireless network that the wireless communication device is to receive the selected one of the simple internet connection and the encrypted internet connection.

2. The method of claim 1 wherein:
   receiving the authorization request comprises receiving the authorization request indicating an application being executed on the wireless communication device; and
   selecting the one of the simple internet connection and the encrypted internet connection comprises selecting the one of the simple internet connection and the encrypted internet connection based on the indicated application.

3. The method of claim 1 wherein the encrypted internet connection comprises a secure tunnel to a home agent of the wireless communication device.

4. The method of claim 1 wherein selecting the one of the simple internet connection and the encrypted internet connection comprises selecting the encrypted internet connection based on a user profile for the wireless communication device that indicates an enterprise access user.

5. The method of claim 1 wherein selecting the one of the simple internet connection and the encrypted internet connection comprises selecting one of an IPv4 protocol and an IPv6 protocol.

6. The method of claim 5 wherein transferring the authorization response for delivery to the visited wireless network comprises transferring the authorization response indicating the selected one of the IPv4 protocol and the IPv6 protocol.

7. The method of claim 1 wherein the encrypted internet connection links the wireless communication device to the internet through a home wireless network.

8. The method of claim 1 wherein the simple internet connection links the wireless communication device to the internet without connecting through a home wireless network.

9. The method of claim 1 wherein the encrypted internet connection utilizes a mobile internet protocol.

10. A wireless network authorization system comprising:
    a communication interface configured to receive an authorization request comprising a Diameter request message for internet access by a wireless communication device transmitted from a visited wireless network, the wireless network authorization system associated with a home wireless network of the wireless communication device;
    a processing system configured, in response to the authorization request, to select one of a simple internet connection and an encrypted internet connection for the wireless communication device; and
    the communication interface configured to transfer an authorization response comprising a Diameter response message for delivery to the visited wireless network indicating to the visited wireless network that the wireless communication device is to receive the selected one of the simple internet connection and the encrypted internet connection.

11. The wireless network authorization system of claim 10 wherein:
    the communication interface is configured to receive the authorization request indicating an application being executed on the wireless communication device; and
    the processing system is configured to select the one of the simple internet connection and the encrypted internet connection based on the indicated application.

12. The wireless network authorization system of claim 10 wherein the encrypted internet connection comprises a secure tunnel to a home agent of the wireless communication device.

13. The wireless network authorization system of claim 10 wherein the processing system is configured to select the one of the simple internet connection and the encrypted internet connection based on a user profile for the wireless communication device that indicates an enterprise access user.

14. The wireless network authorization system of claim 10 wherein the processing system is configured, in response to the authorization request, to select one of an IPv4 protocol and an IPv6 protocol.

15. The wireless network authorization system of claim 14 wherein the communication interface is configured to transfer the authorization response for delivery to the visited wireless network indicating the selected one of the IPv4 protocol and the IPv6 protocol.

16. The wireless network authorization system of claim 10 wherein the encrypted internet connection links the wireless communication device to the internet through a home wireless network.

17. The wireless network authorization system of claim 10 wherein the simple internet connection links the wireless communication device to the internet without connecting through a home wireless network.

18. The wireless network authorization system of claim 10 wherein the encrypted internet connection utilizes a mobile internet protocol.

\* \* \* \* \*